United States Patent
Liu et al.

(10) Patent No.: US 6,513,476 B1
(45) Date of Patent: Feb. 4, 2003

(54) PISTON HAVING COMBUSTION CHAMBER DEFINED IN THE CROWN

(75) Inventors: Zhengbai Liu, Lisle, IL (US); Xinqun Gui, Lisle, IL (US)

(73) Assignee: International Engine Inellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/933,407

(22) Filed: Aug. 20, 2001

(51) Int. Cl.[7] ................................................. F02B 3/00
(52) U.S. Cl. ..................................................... 123/193.6
(58) Field of Search ............................... 123/193.6, 657, 123/661, 663, 664

(56) References Cited

U.S. PATENT DOCUMENTS

| | | | |
|---|---|---|---|
| 4,164,913 A | * 8/1979 | Komiyama et al. | 123/193.6 |
| 4,535,683 A | * 8/1985 | Dworak et al. | 123/193.6 |
| 5,560,334 A | * 10/1996 | Daxer Alet | 123/193.6 |
| 5,653,204 A | * 8/1997 | Shaffer | 123/193.6 |
| 5,809,962 A | * 9/1998 | Abbott et al. | 123/193.6 |
| 5,868,112 A | 2/1999 | Mahakul et al. | |
| 6,112,715 A | * 9/2000 | Nigro et al. | 123/193.6 |

\* cited by examiner

*Primary Examiner*—Marguerite McMahon
(74) *Attorney, Agent, or Firm*—Dennis Kelly Sullivan; Jeffrey P. Calfa; Neil T. Powell

(57) ABSTRACT

A combustion chamber assembly for use in a diesel engine includes a combustion chamber being defined in a crown of a piston, the piston having a central axis, the combustion chamber having a center portion being elevated relative to a bottom plane of the combustion chamber. The center portion is defined in part by a portion of a sphere, the sphere having a radius, the origin of the radius lying on the combustion chamber central axis. The combustion chamber further has an outer margin, the outer margin being defined in part by a portion of a sphere, the sphere having a radius, the origin of the radius lying on the combustion chamber central axis and being greater than the center portion radius. The spherical center portion and the spherical outer margin are connected by an annular surface. And, the combustion chamber has a plurality of curved surfaces having smooth tangential transitions between adjacent smooth surfaces, the smooth surfaces including the spherical center portion and the spherical outer margin in combination with the annular surface. A piston incorporating the aforementioned combustion chamber and a method of forming the combustion chamber are further included.

52 Claims, 2 Drawing Sheets

PISTON HAVING COMBUSTION CHAMBER DEFINED IN THE CROWN

TECHNICAL FIELD

The present invention relates to a piston designed for use in a compression ignition (diesel) internal combustion engine. More particularly, the present invention relates to a piston having a combustion chamber defined in the crown thereof.

BACKGROUND OF THE INVENTION

Many attempts have been made to produce an ideal flow pattern for the charge of air and fuel within the combustion chamber of an internal combustion engine. Considerations that must be taken into effect include, but are not limited to, providing for adequate power generation minimizing the $NO_x$ entrained in the engine exhaust and minimizing the amount of soot particulate also entrained in the engine exhaust.

It is known that changes in any one of a variety of engine design/operating variables, such as engine compression, combustion chamber shape, fuel injection spray pattern, and other variables can have an effect on both emissions and power generated.

The amount of soot that is expelled with the engine's exhaust is unsightly and generates public pressure to clean up diesel engines. Further, the amount of soot that is entrained in the engine's lubrication oil can have a deleterious effect on engine reliability. Soot is very abrasive and can cause high engine wear.

There is additionally a great deal of pressure to reduce the $NO_x$ emissions from the engine. Ever increasing regulatory demands mandate reduced levels of $NO_x$. Typically, a combustion chamber design that is effective at reducing $NO_x$ levels has been found to increase the levels of soot and vice-versa. Additionally, doing either of the aforementioned typically reduces engine torque and power outputs.

There are numerous examples of combustion chambers formed in the crown of piston. Notwithstanding all these prior art designs, there remains a need for reduction both in $NO_x$ and entrained soot while at the same time maintaining or enhancing engine torque and power outputs.

SUMMARY OF THE INVENTION

The piston of the present invention substantially meets the aforementioned needs in the industry. The combustion chamber defined in the crown of the piston has been shown to both reduce soot entrainment and $NO_x$ emissions while at the same time slightly increasing engine power output. The piston has been shown to function effectively with heads having two or more valves. A further advantage of the combustion chamber of the present invention is that by being symmetrical with respect to a combustion chamber central axis the combustion chamber is relatively easily formed in the crown of the piston.

The present invention is a combustion chamber assembly for use in a diesel engine includes a combustion chamber being defined in a crown of a piston, the piston having a central axis, the combustion chamber having a center portion being elevated relative to a bottom plane of the combustion chamber. The center portion is defined in part by a portion of a sphere, the sphere having a radius, the origin of the radius lying on the combustion chamber central axis. The combustion chamber further has an outer margin, the outer margin being defined in part by a portion of a sphere, the sphere having a radius, the origin of the radius lying on the combustion chamber central axis and being greater than the center portion radius. The spherical center portion and the spherical outer margin are connected by an annular surface. And, the combustion chamber has a plurality of curved surfaces having smooth tangential transitions between adjacent smooth surfaces, the smooth surfaces including the spherical center portion and the spherical outer margin in combination with the annular surface. The present invention is further a piston having the aforementioned combustion chamber assembly and method of forming the aforementioned combustion chamber.

DETAILED DESCRIPTION OF THE DRAWINGS

Figure 1:
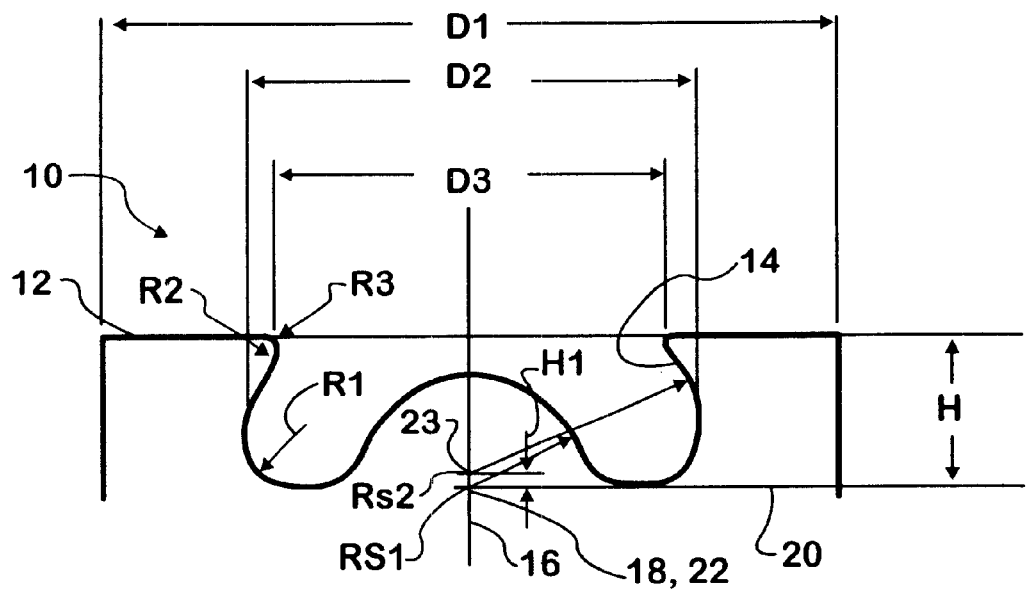
FIG. 1 is a sectional view of the piston of the present invention.

The piston of the present invention is shown generally at 10 in FIG. 1. The crown 12 of the piston 10 defines in part the upper margin of the piston 10. The combustion chamber 14 of the present invention is defined in the crown 12. It should be noted that the combustion chamber 14 is symmetrical about the longitudinal axis 16 that is coincident or at an offset with the center axis of the piston 10. The various radii (R), diameters (D), and heights (H) that will be described below are clearly indicated in the depiction of FIG. 1.

The piston 10 of the present invention is designed primarily for use in heavy duty diesel engines but would also be applicable to lighter duty diesel engines. The piston 10 may be utilized with two-valve or multiple-valve heads. It is desirable that the fuel be injected proximate the center of the combustion chamber and that the injection pattern be radially symmetrical. In a preferred embodiment, the injector injects a spray of fuel that has six subsprays that are equi-angularly displaced relative to the axis 16.

The combustion chamber 14 defined in the crown 12 of the piston 10 is comprised of curved surfaces, being both spherical and annular surfaces. The spherical surfaces are designated by a radius RS and the annular surfaces are designated by a radius R. The combustion chamber 14 has no flat surfaces. There is a smooth, tangential transition between the various curved surfaces that define the combustion chamber 14, as described in greater detail below.

Generally, the combustion chamber 14 is comprised of two spherical surfaces RS1 and RS2. The two spherical surfaces RS1 and RS2 are connected by an annular surface R1 at the bottom of the combustion chamber 14. The spherical surface RS2 transits to the piston crown 12 through two annular surfaces R2, R3 having relatively small curvatures and defining a reentrant intersection with the crown 12.

There are a number of parameters that control the geometry of the combustion chamber 14 and thereby control the diesel engine combustion performance as well as $NO_x$ and soot emissions. A portion of a spherical surface, defined by the radius RS1, is located in the central space (center portion) of the combustion chamber 14. The origin 18 of the spherical surface is located on the center axis 16 of the combustion chamber 14. The distance between the origin 18 of the spherical surface and the point of intersection of the axis 16 with the bottom plane 20 of the combustion chamber 14 is equal to or greater than zero and should be less than 0.25D2 (Please check which D1, D2 or D3.). As depicted in FIG. 1, the origin 18 is at the point of intersection 22 of the axis 16 of the combustion chamber 14 and the bottom plane 20 of the combustion chamber 14. In other words, the origin 18 and the point of intersection 22 are depicted as being coincident. This is the preferred disposition of the origin 18 at the point of intersection 22 of the axis 16 of the combustion chamber 14 and the bottom plane 20 of the combustion chamber, but there could as well be a vertical distance between the origin 18 and the point of intersection 22.

The second spherical surface with the radius RS2 is located outside the first (center portion) spherical surface RS1 and defines in part an outer margin of the combustion chamber 14. The outer margin spherical surface RS2 has an origin 23 that is located on the center axis 16. The distance between the respective two origins 18, 23 of the center portion spherical surface RS1 and the outer margin spherical surface RS2 is equal to or greater than 0.0 and less than±2 (R1). Preferably, the distance is zero, the two origins 18, 23 being co-centric and preferably located at the intersection of the central axis 16 and the bottom plane 20 of the combustion chamber 14. It should be noted that the distance value is positive when the origin 23 is elevated with respect to the origin 18, a positive distance H1 being depicted in FIG. 1. Further, the ratio of RS2/RS1 is equal to or greater than 1.0 and less than 3.0. The ratio of RS2/RSI is preferably about 2.0 and more specifically 2.073.

The following ratios define certain parameters of the combustion chamber 14.

The ratio of RS1/D2 should be greater than 0.10 and should be less than 0.45 and is preferably 0.253.

The ratio of D2/D1 should be greater than 0.45 and should be less than 0.85 and is preferably 0.619.

The ratio of D3/D2 should be greater than 0.75 and should be less than 0.95 and is preferably 0.849.

The ratio of H/D2 should be greater than 0.15 and should be less than 0.45 and is preferably 0.337.

The ratio of R1/D2 should be greater than 0.11 and should be less than 0.45 and is preferably 0.136.

The ratio of R2/D2 should be greater than 0.0 and should be less than 0.35 and is preferably 0.11.

The ratio of R3/D2 should be greater than 0.0 and should be less than 0.2 and is preferably 0.14.

The combustion chamber 14 as indicated above is comprised of combined spherical and annular surfaces. It is noted that the transition between RS1 and R1 is smooth and tangential, the transition between R1 and RS2 is smooth and tangential, the transition between RS2 and R2 is smooth and tangential. and the transition between R2 and R3 is smooth and tangential. In this manner, there are no flat surfaces that define the combustion chamber 14. The curves and smooth transitions as previously described promote smooth flow in the combustion chamber 14 and act to reduce the thermal loading in the combustion chamber 14. Further, the combustion chamber 14 is symmetrical about the axis 16. Accordingly, it is much easier to turn the combustion chamber 14 as compared to an asymmetrical combustion chamber defined in a piston.

It should further be noted that the radii R2, R3 define a reentrant combustion chamber 14 at the intersection with the crown 12, as distinct from an open combustion chamber as depicted in some of the prior art.

Figure 2:
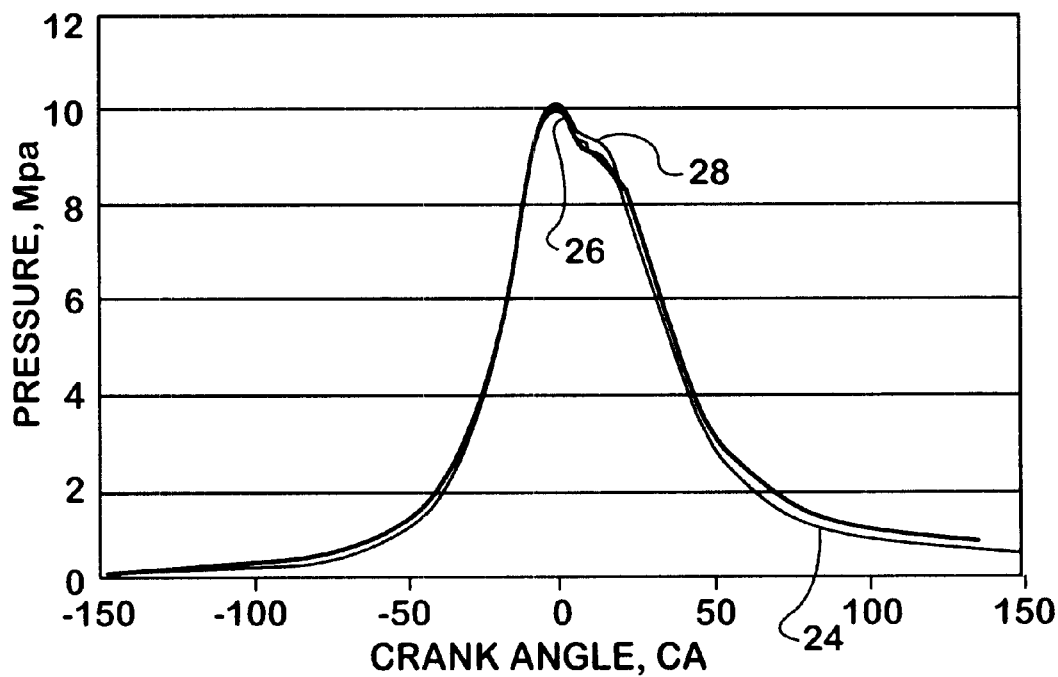
FIG. 2 is a graphic representation of power of an existing piston and combustion chamber as compared to the piston and combustion chamber of the present invention.
Figure 3:
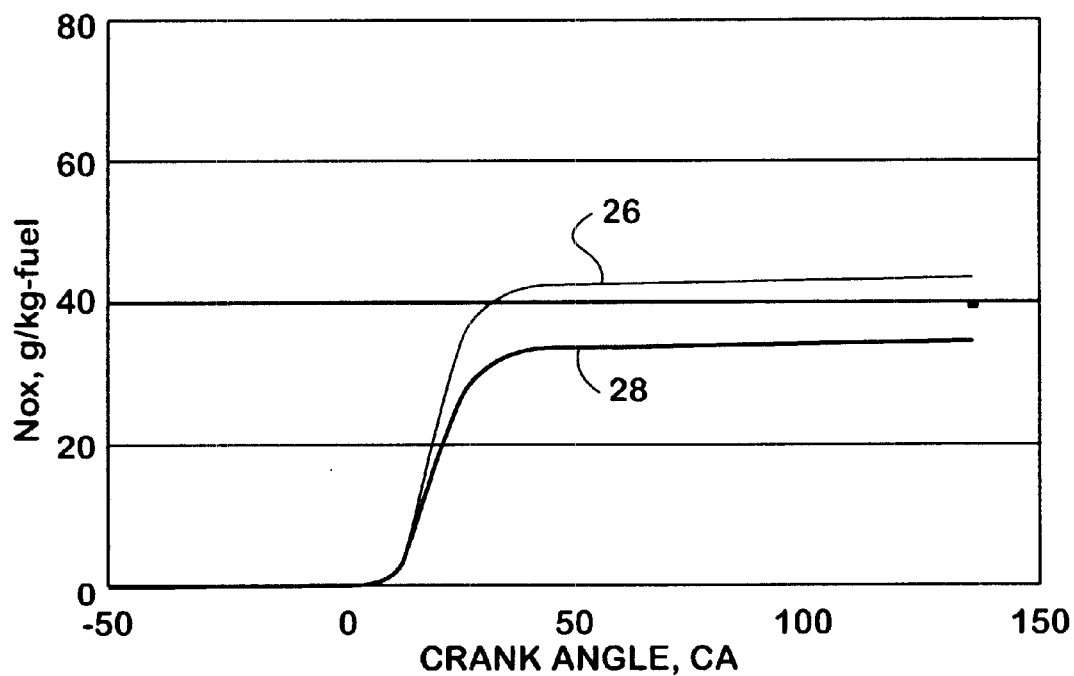
FIG. 3 is a graphic representation of an $NO_x$ generated by an existing piston and combustion chamber and the piston and combustion chamber of the present invention.
Figure 4:
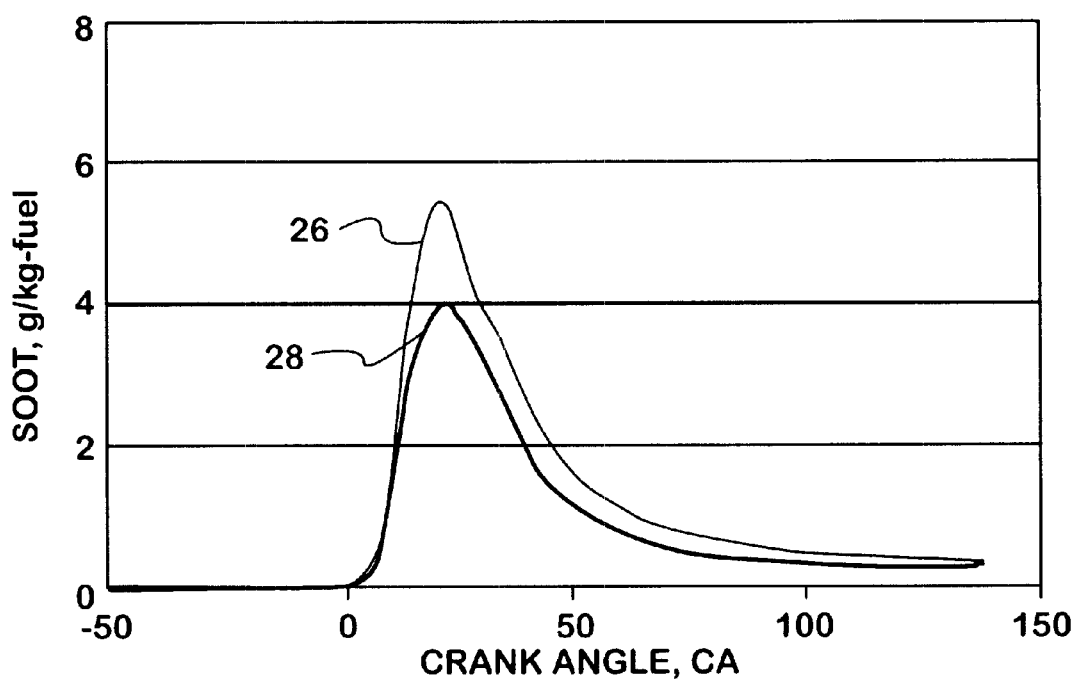
FIG. 4 is a graphic representation of the soot generated by an existing piston and combustion as compared to the piston and combustion chamber of the present invention.

Combustion performance improvement and pollutant emission reduction are depicted in FIGS. 2–4. Referring to FIG. 2, power output is the area beneath each of the curves. A first actual experiment of a known combustion chamber is depicted at curve 24. Close to the peak of the curve 24, a trace of a simulation of the known combustion chamber that resulted in the curve 24 closely overlies the curve 24. The trace 26, by closely overlying the curve 24. substantiates the validity of the simulation. This same simulation was then used to simulate the performance of the combustion chamber 14. The simulation of the combustion chamber 14 is depicted by curve 28. It is noted that the area underneath the curve 28 is slightly greater than the area underneath the curve 26, indicating that the power output resulting from the combustion chamber 14 is slightly greater than the power output of the known combustion chamber.

FIG. 3 depicts the simulated $NO_x$ generation of a known combustion chamber as depicted by line 26 and the simulated results of $NO_x$ generation of the combustion chamber 14 of the present invention as depicted in line 28. It is noted that the $NO_x$ generation by the combustion chamber 14 of the present invention is significantly less than the $NO_x$ of the known combustion chamber as depicted by line 26.

FIG. 4 depicts the simulated soot generation of a known combustion chamber as depicted by line 26 in comparison with the simulated soot generation of the combustion chamber 14 of the present invention as depicted by line 28. It should be noted that soot generation of the combustion chamber 14 is significantly less than the soot generation of the known combustion chamber. It is significant to note in reference to FIGS. 2–4 that the combustion chamber 14 results in increased power output and at the same time that combustion chamber 14 decreases both the $NO_x$ generation and soot generation as compared to a known combustion chamber.

What is claimed is:

1. A combustion chamber assembly for use in a diesel engine, comprising:

a combustion chamber being defined in a crown of a piston, the piston having a central axis, the combustion chamber having a center portion being elevated relative to a bottom plane of the combustion chamber, the center portion being a continuous surface defined in part by a portion of a sphere, the sphere having a radius, the origin of the radius lying on the piston central axis and the combustion chamber further having an outer margin, the outer margin being defined in part by a portion of a sphere, the sphere having a radius, the origin of the radius lying on the piston central axis and being greater than the center portion radius;

the spherical center portion and the spherical outer margin being connected by an annular surface; and the combustion chamber having a plurality of curved surfaces having smooth tangential transitions between adjacent smooth surfaces, the smooth surfaces including the spherical center portion and the spherical outer margin in combination with the annular surface.

2. The combustion chamber assembly of claim 1 wherein the distance between the origin of the center portion spherical surface and the origin of the spherical outer margin is equal to or greater than 0.0.

3. The combustion chamber assembly of claim 1 wherein the ratio of the radius of the spherical outer margin and radius of the center portion spherical surface is greater than 1.0 and less than 3.0.

4. The combustion chamber assembly of claim 1 wherein a plurality of annular surfaces cooperate to define a reentrant interface with the crown of the piston.

5. The combustion chamber assembly of claim 1 wherein the ratio of the radius of the center portion spherical surface to the maximum diameter of the combustion chamber is between 0.10 and 0.45.

6. The combustion chamber assembly of claim 5 wherein the ratio of the radius of the center portion spherical surface to the maximum diameter of the combustion chamber is substantially 0.25.

7. The combustion chamber assembly of claim 1 wherein the ratio of the diameter of the combustion chamber at the point of intersection with the crown of the piston to the maximum diameter of the combustion chamber is greater than 0.75 and less than 0.95.

8. The combustion chamber assembly of claim 7 wherein the ratio of the diameter of the combustion chamber at the point of intersection with the crown of the piston to the maximum diameter of the combustion chamber is substantially 0.85.

9. The combustion chamber assembly of claim 4 wherein the annular surfaces defining in part the combustion chamber are defined by at least three radii.

10. The combustion chamber assembly of claim 1 wherein the ratio of a certain distance, the certain being distance from the bottom plane to the crown, to the maximum diameter of the combustion chamber is greater than 0.15 and less than 0.45.

11. The combustion chamber assembly of claim 10 wherein the ratio of the certain distance to the maximum diameter of the combustior chamber is substantially 0.33.

12. The combustion chamber assembly of claim 1 being free of flat surfaces.

13. A combustion chamber assembly for use in a diesel engine, comprising:
a combustion chamber being defined in a crown of a piston, the piston having a central axis, the combustion chamber having a center portion being elevated relative to a bottom plane of the combustion chamber, the center portion being defined in part by a portion of a sphere, the sphere having a radius, the origin of the radius lying on the piston central axis and the combustion chamber further having an outer margin, the outer margin being defined in part by a portion of a sphere, the sphere having a radius, the origin of the radius lying on the piston central axis and being greater than the center portion radius;
the spherical center portion and the spherical outer margin being connected by an annular surface; and
the combustion chamber having a plurality of curved surfaces having smooth tangential transitions between adjacent smooth surfaces, the smooth surfaces including the spherical center portion and the spherical outer margin in combination with the annular surface, the origin of the center portion spherical surface and the origin of the spherical outer margin being co-centric.

14. A combustion chamber assembly for use in a diesel engine, comprising:
a combustion chamber being defined in a crown of a piston, the piston having a central axis, the combustion chamber having a center portion being elevated relative to a bottom plane of the combustion chamber, the center portion being defined in part by a portion of a sphere, the sphere having a radius, the origin of the radius lying on the piston central axis and the combustion chamber further having an outer margin, the outer margin being defined in part by a portion of a sphere, the sphere having a radius, the origin of the radius lying on the piston central axis and being greater than the center portion radius;
the spherical center portion and the spherical outer margin being connected by an annular surface; and
the combustion chamber having a plurality of curved surfaces having smooth tangential transitions between adjacent smooth surfaces, the smooth surfaces including the spherical center portion and the spherical outer margin in combination with the annular surface, the ratio of the radius of the spherical outer margin and radius of the center portion spherical surface being substantially 2.0.

15. A piston for use in a diesel engine, the piston having a central axis, comprising:
a combustion chamber being defined in a crown of the piston, the combustion chamber having a center portion being elevated relative to a bottom plane of the combustion chamber, the center portion being defined in part by a portion of a sphere, the sphere having a radius, the origin of the radius lying on the piston central axis;
the combustion chamber further having an outer margin, the outer margin being a continuous surface defined in part by a portion of a sphere, the sphere having a radius, the origin of the radius lying on the piston central axis and being greater than the center portion radius;
the spherical center portion and the spherical outer margin being connected by an annular surface; and
the combustion chamber having a plurality of curved surfaces having smooth tangential transitions between adjacent smooth surfaces, the smooth surfaces including the spherical center portion and the spherical outer margin in combination with the annular surface.

16. The piston of claim 15 wherein the distance between the origin of the center portion spherical surface and the origin of the spherical outer margin is equal to or greater than 0.0.

17. The piston of claim 16 wherein the origin of the center portion spherical surface and the origin of the spherical outer margin are co-centric.

18. The piston of claim 15 wherein the ratio of the radius of the spherical outer margin and radius of the center portion spherical surface is greater than 1.0 and less than 3.0.

19. The piston of claim 15 wherein the ratio of the radius of the spherical outer margin and radius of the center portion spherical surface is substantially 2.0.

20. The piston assembly of claim 15 wherein a plurality of annular surfaces cooperate to define a reentrant interface with the crown of the piston.

21. The piston of claim 15 wherein the ratio of the radius of the center portion spherical surface to the maximum diameter of the combustion chamber is between 0.10 and 0.45.

22. The piston of claim 21 wherein the ratio of the radius of the center portion spherical surface to the maximum diameter of the combustion chamber is substantially 0.25.

23. The piston of claim 15 wherein the ratio of the diameter of the combustion chamber at the point of intersection with the crown of the piston to the maximum diameter of the combustion chamber is greater than 0.75 and less than 0.95.

24. The piston of claim 23 wherein the ratio of the diameter of the combustion chamber at the point of intersection with the crown of the piston to the maximum diameter of the combustion chamber is substantially 0.85.

25. The piston of claim 20 wherein the annular surfaces defining in part the combustion chamber are defined by at least three radii.

26. The piston of claim 15 wherein the ratio of a certain distance, the certain distance being from the bottom plane to the crown, to the maximum diameter of the combustion chamber is greater than 0.15 and less than 0.45.

27. The piston of claim 28 wherein the ratio of the certain distance to the crown to the maximum diameter of the combustion chamber is substantially 0.33.

28. The piston of claim 15 being free of flat surfaces.

29. A combustion chamber assembly for use in a diesel engine, comprising:

a combustion chamber being defined in a crown of a piston, the piston having a central axis, the combustion chamber having a center portion being elevated relative to a bottom plane of the combustion chamber, the center portion being defined in part by a portion of a sphere, the sphere having a radius and an origin, the origin of the center portion spherical surface lies coincident with a point of intersection of the bottom plane with the piston central axis and the combustion chamber further having an outer margin, the outer margin being defined in part by a portion of a sphere, the sphere having a radius, the origin of the center portion spherical surface and the origin of the spherical outer margin are co-centric;

the spherical center portion and the spherical outer margin being connected by an annular surface; and the combustion chamber having a plurality of curved surfaces having smooth tangential transitions between adjacent smooth surfaces, the smooth surfaces including the spherical center portion and the spherical outer margin in combination with the annular surface.

30. The combustion chamber assembly of claim 29 wherein the ratio of the radius of the spherical outer margin and radius of the center portion spherical surface is greater than 1.0 and less than 3.0.

31. The combustion chamber assembly of claim 29 wherein the ratio of the radius of the spherical outer margin and radius of the center portion spherical surface is substantially 2.0.

32. The combustion chamber assembly of claim 29 wherein a plurality of annular surfaces cooperate to define a reentrant interface with the crown of the piston.

33. The combustion chamber assembly of claim 29 wherein the ratio radius of the center portion spherical surface to the maximum diameter of the combustion chamber is between 0.10 and 0.45.

34. The combustion chamber assembly of claim 33 wherein the ratio of the radius of the center portion spherical surface to the maximum diameter of the combustion chamber is substantially 0.25.

35. The combustion chamber assembly of claim 29 wherein the ratio of the diameter of the combustion chamber at the point of intersection with the crown of the piston to the maximum diameter of the combustion chamber is greater than 0.75 and less than 0.95.

36. The combustion chamber assembly of claim 35 wherein the ratio of the diameter of the combustion chamber at the point of intersection with the crown of the piston to the maximum diameter of the combustion chamber is substantially 0.85.

37. The combustion chamber assembly of claim 32 wherein the annular surfaces defining in part the combustion chamber are defined by at least three radii.

38. The combustion chamber assembly of claim 29 wherein the ratio of a certain distance, the certain distance being from the bottom plane to the crown, to the maximum diameter of the combustion chamber is greater than 0.15 and less than 0.45.

39. The combustion chamber assembly of claim 38 wherein the ratio of the certain distance to the maximum diameter of the combustion chamber is substantially 0.33.

40. The combustion chamber assembly of claim 29 being free of flat surfaces.

41. A method of forming a combustion chamber for use in a diesel engine, comprising:

defining a combustion chamber in a crown of a piston, the piston having a central axis;

defining a combustion chamber center portion as a continuous surface being elevated relative to a bottom plane of the combustion chamber;

defining the center portion in part by a portion of a sphere, the sphere having a radius, locating the origin of the radius lying on the piston central axis; and defining a plurality of combustion chamber curved surfaces having smooth tangential transitions between adjacent smooth surfaces, the smooth surfaces including the spherical center portion in combination with the plurality of annular surfaces.

42. The method of claim 41 including disposing the center portion sphere relative to a spherical outer margin such that the distance between the origin of the center portion spherical portion and the origin of the spherical outer margin is equal to or greater than 0.0.

43. The method of claim 41 including defining the center portion spherical portion relative to the spherical outer margin such that the ratio of the radius of the spherical outer margin and radius of the center portion spherical surface is greater than 1.0 and less than 3.0.

44. The method of claim 41 including defining the center portion spherical portion relative to the spherical outer margin such that a plurality of annular surfaces define a reentrant interface with the crown of the piston.

45. The method of claim 41 including defining the center portion spherical portion relative to the spherical outer margin such that the ratio of the radius of the center portion spherical surface to the maximum diameter of the combustion chamber is between 0.10 and 0.45.

46. The method of claim 41 including defining the center portion spherical portion relative to the spherical outer margin such that the ratio of the diameter of the combustion chamber at the point of intersection with the crown of the piston to the maximum diameter of the combustion chamber is greater than 0.75 and less than 0.95.

47. The method of claim 46 including defining the center portion spherical portion relative to the spherical outer margin such that the ratio of the diameter of the combustion chamber at the point of intersection with the crown of the piston to the maximum diameter of the combustion chamber is substantially 0.85.

48. The method of claim 41 including defining the plurality of annular surfaces by at least three radii.

49. The method of claim 41 including defining a reentrant interface with the crown of the piston.

50. The method of claim 41 including forming the combustion chamber free of flat surfaces.

51. A method of forming a combustion chamber for use in a diesel engine, comprising:

defining a combustion chamber in a crown of a piston, the piston having a central axis;

defining a combustion chamber center portion being elevated relative to a bottom plane of the combustion chamber;

defining the center portion in part by a portion of a sphere, the sphere having a radius, locating the origin of the radius lying on the piston central axis;

defining a plurality of combustion chamber curved surfaces having smooth tangential transitions between adjacent smooth surfaces, the smooth surfaces including the spherical center portion in combination with the plurality of annular surfaces; and disposing the center portion sphere relative to the spherical outer margin such that the origin of the center portion spherical portion and the origin of the spherical outer margin are co-centric.

52. A method of forming a combustion chamber for use in a diesel engine, comprising:

defining a combustion chamber in a crown of a piston, the piston having a central axis;

defining a combustion chamber center portion being elevated relative to a bottom plane of the combustion chamber;

defining the center portion in part by a portion of a sphere, the sphere having a radius, locating the origin of the radius lying on the piston central axis;

defining a plurality of combustion chamber curved surfaces having smooth tangential transitions between adjacent smooth surfaces, the smooth surfaces including the spherical center portion in combination with the plurality of annular surfaces; and defining the center portion spherical portion relative to the spherical outer margin such that the ratio of the radius of the spherical outer margin and radius of the center portion spherical surface is substantially 2.0.

* * * * *